US005517820A

United States Patent [19]
Kuroda et al.

[11] Patent Number: 5,517,820
[45] Date of Patent: May 21, 1996

[54] EXHAUST GAS PURIFYING APPARATUS AND METHOD FOR INTERNAL COMBUSTION ENGINE

[75] Inventors: Osamu Kuroda; Takahiro Tachi; Miho Saito, all of Hitachi; Toshio Ogawa, Takahagi; Noriko Watanabe; Akira Kato, both of Mito; Hiroshi Miyadera, Hitachi, all of Japan

[73] Assignee: Hitachi, Ltd., Japan

[21] Appl. No.: 214,303

[22] Filed: Mar. 17, 1994

[30] Foreign Application Priority Data

Mar. 17, 1993 [JP] Japan .................................. 5-056752

[51] Int. Cl.$^6$ ....................................................... F01N 3/20
[52] U.S. Cl. ................... 60/274; 60/284; 60/288; 60/297; 60/301
[58] Field of Search ...................... 60/274, 286, 288, 60/301, 297, 284

[56] References Cited

U.S. PATENT DOCUMENTS

| | | |
|---|---|---|
| 5,051,244 | 9/1991 | Dunne et al. |
| 5,315,824 | 5/1994 | Takeshima ........................ 60/297 |
| 5,331,809 | 7/1994 | Takeshima ........................ 60/298 |
| 5,365,733 | 11/1994 | Takeshima ........................ 60/301 |

FOREIGN PATENT DOCUMENTS

| | | |
|---|---|---|
| 0424926A1 | 10/1990 | European Pat. Off. |
| 0460542A2 | 5/1991 | European Pat. Off. |
| 0485179A2 | 5/1991 | European Pat. Off. |
| 0450542A3 | 5/1991 | European Pat. Off. |
| 0485179A3 | 11/1991 | European Pat. Off. |
| 2686375 | 1/1992 | France . |
| 1-130735 | 5/1989 | Japan . |
| 3141816 | 6/1991 | Japan . |
| 3-225013 | 10/1991 | Japan . |
| 4-175416 | 6/1992 | Japan . |

*Primary Examiner*—Douglas Hart
*Attorney, Agent, or Firm*—Evenson, McKeown, Edwards & Lenahan

[57] ABSTRACT

An apparatus is provided for purifying an exhaust gas discharged from an internal combustion engine, which comprises a first exhaust gas passage including a nitrogen oxide removing catalyst and a three way catalyst, a second exhaust gas passage including the three way catalyst, a gas flow regulator for selectively directing the exhaust gas to the first and second exhaust gas passages, and a control unit which directs the exhaust gas to the first exhaust gas passage (thereby passing exhaust gas first through the nitrogen oxide removing catalyst and thereafter through the three way catalyst) when the temperature of the nitrogen oxide removing catalyst is within a hydrocarbon adsorbing range of temperature thereof while the engine is warming up, and to the second exhaust gas passage (thereby passing the exhaust gas only through the three way catalyst) when the temperature of the nitrogen oxide removing catalyst exceeds the hydrocarbon adsorbing range of temperature thereof.

31 Claims, 7 Drawing Sheets

POSITION b

FIG. 8

POSITION a

FIG. 9

EXHAUST GAS PURIFYING APPARATUS AND METHOD FOR INTERNAL COMBUSTION ENGINE

BACKGROUND OF THE INVENTION

The present invention relates to an exhaust gas purifying apparatus and method for an internal combustion engine, and more particularly, to an exhaust gas purifying apparatus and method suitable for purifying or removing nitrogen oxides, carbon monoxide and hydrocarbons contained in an exhaust gas discharged from an internal combustion engine which is capable of operating effectively in a lean air to fuel ratio region.

An exhaust gas discharged from an internal combustion engine for a vehicle or the like contains toxic components such as carbon monoxide ( CO ), hydro-carbons ( HC ), and nitrogen oxides ( $NO_x$ ) which are sources of air pollution.

Therefore, extensive research and development on purifying the exhaust gas with catalysts has been carried out. The principle exhaust gas purifying method for the internal combustion engine employs a so-called three way catalyst composed of catalytic substances such as Pt, Rh, Pd and so on to oxidize and purify the HC and CO and to reduce and purify the $NO_x$.

The exhaust gas purifying method using catalysts is disadvantageous however, in that the exhaust gas is not sufficiently purified until the temperature of the engine rises up to about 300° C. at which the catalyst exhibits its activity, and therefore, the HC mostly produced when the engine starts cannot be substantially purified. Thus, it is desirable to develop a technology for purifying the HC during the period from the time when the engine starts to when the temperature of the engine rises up to the temperature at which the catalyst exhibits its activity.

In order to solve this problem, Japanese Patent Application Laid-Open No. 3-141816 (1991) discloses a method wherein the HC discharged when the engine starts is adsorbed by an adsorbent which is reactivated by its self-heating after completion of the warm-up of the engine.

Incidentally, the three way catalyst can purify the toxic components effectively only in the case where the engine is operating substantially in the vicinity of a theoretical or stoichiometric air to fuel ratio, i.e. the concentration of co-existing $O_2$ in the exhaust gas is approximately 0.5 vol % or less. As well known, a narrow region in the vicinity of the stoichiometric air to fuel ratio including this is called a window. In view of this, although the air to fuel ratio for a vehicle changes according to the operating condition, the upper limit of the air-to-fuel A/F has been set at approximately 14.7 which is a stoichiometric air to fuel ratio, where A represents the total weight of air and fuel and F represents weight of fuel.

However, if the engine may be operated in an air to fuel ratio region leaner than the theoretical air to fuel ratio, i.e. lean region, fuel cost can be decreased and the amount of toxic components in the exhaust gas can also be decreased. For this reason, a "lean burn" combustion technology has been developed. In recent years, there is a strong tendency for the range of air-to-fuel ratio to widen toward a leaner region (22 ~ 24 or more measured by A/F ).

Accordingly, a $NO_x$ purifying or removing technology suitable for the lean burn combustion, (i.e. a method to remove $NO_x$ in the presence of oxygen) is widely studied, and a method is thought to be promising, has been developed in which $NO_x$ is reduced by using hydro-carbons as a reductant with a catalyst. For a catalyst for removing $NO_x$ using hydrocarbons as a reductant in the presence of oxygen, i.e. a lean $NO_x$ catalyst, zeolite carrying a transition metal such as copper is described, for example, in Japanese Patent Application Laid-Open No. 1-130735 (1989), and systems utilizing the catalyst of this kind is described in Japanese Patent Application Laid-Open No. 4-175416 (1992) and Japanese Patent Application Laid-Open No. 3-225013 (1991).

The method of using the lean $NO_x$ catalyst and the three way catalyst when the air to fuel ratio is in the lean or rich region as described in Japanese Patent Application Laid-Open No. 4-175416 (1992) or Japanese Patent Application Laid-Open No. 3-225013 (1991). However, the purification of the HC discharged when the engine starts is not suggested.

SUMMARY OF THE INVENTION

An object of the present invention is to provide an exhaust gas purifying apparatus and method suitable for purifying or removing nitrogen oxides, carbon monoxide and hydrocarbons contained in the exhaust gas discharged from the internal combustion engine.

Another object of the present invention is to provide an exhaust gas purifying apparatus and method suitable for purifying or removing hydrocarbons mainly produced when the engine starts in addition to purifying or removing the exhaust gas in the full air to fuel ratio region of lean, rich and stoichiometric regions.

According to the present invention, an apparatus for purifying an exhaust gas discharged from an internal combustion engine, has a first exhaust gas passage including a nitrogen oxide removing catalyst and a three way catalyst, a second exhaust gas passage including the three way catalyst, and a gas flow regulator for selectively directing the exhaust gas to the first and second exhaust gas passages. A valve control arrangement directs the exhaust gas to the first exhaust gas passage, through the nitrogen oxide removing catalyst and then through the three way catalyst, when the temperature of the nitrogen oxide removing catalyst is within a hydrocarbon, adsorbing range while the engine is warming up and to the second exhaust gas passage, through the three way catalyst, when the temperature of the nitrogen oxide removing catalyst exceeds the hydrocarbon adsorbing range.

According to another aspect of the present invention, a method is provided of purifying an exhaust gas discharged from an internal combustion engine provided with a first exhaust gas passage including a nitrogen oxide removing catalyst and a three way catalyst and a second exhaust gas passage including the three way catalyst, which comprises the steps of judging whether or not the engine is warming up after starting, judging whether or not the temperature of the nitrogen oxide removing catalyst exceeds a hydrocarbon adsorbing range, and directing the exhaust gas, first exhaust gas passage through the nitrogen oxide removing catalyst and then through the three way catalyst, when the temperature of the nitrogen oxide removing catalyst is within the hydrocarbon adsorbing range while the engine is warming up and to the second exhaust gas passage, through the three way catalyst when the temperature of the nitrogen oxide removing catalyst exceeds the hydrocarbon adsorbing range in association with the warm-up judging means and the nitrogen oxide removing temperature judging means.

The term "nitrogen oxide removing catalyst" (which is hereinafter referred simply to as "lean $NO_x$ catalyst") is intended to mean a catalyst suitable for purifying or removing nitrogen oxides contained in exhaust gas which includes more oxygen then is necessary for substantially completely oxidizing at least carbon monoxide and hydrocarbons contained therein. Further, the term "three way catalyst" is intended to mean a catalyst suitable for purifying or removing nitrogen oxides, carbon monoxide and hydrocarbons contained in the exhaust gas.

It has been found through experimental studies by the inventors that the lean $NO_x$ catalyst can adsorb hydrocarbons contained in the exhaust gas in the range of temperature in which the three way catalyst is substantially inactive, and that the lean $NO_x$ catalyst is most effective in adsorbing hydrocarbons which are mainly produced immediately after the engine starts and cannot be removed by the three way catalyst because of its inactivity. The present invention is based on such facts.

The warm-up judging means may comprise means for detecting the temperature of either the engine cooling water or the exhaust gas. Since the cooling water temperature after completion of the warm-up of the engine is generally about 80° C., an upper limit of the cooling water temperature showing that the engine is warming up may be set at, for example, 70° C. On the other hand, where the warming up degree is judged on the basis of the exhaust gas temperature, an exhaust gas temperature of, for example, 120° C. may be regarded as a standard temperature below which the engine is judged to be in a warming up condition.

According to experimental studies by the inventors, the hydrocarbon adsorbing temperature range has been found to be approximately below 200° C., though it depends on catalytic substances of the lean $NO_x$ catalyst. The lean $NO_x$ catalyst may be of substances such as zeolite, alumina, metal-silicate, and silico-alumino-phosphate having various kinds of $SiO_2/Al_2O_3$ ratios and structures. The temperature of the lean $NO_x$ catalyst may be measured directly by a sensor buried therein or indirectly calculated on the basis of the detecting of the exhaust gas temperature.

The lean $NO_x$ catalyst may carry at least one member of the group consisting of first transition metals and its metal oxides such as Fe, Co, Ni, etc., noble metals and its metal oxides such as Rh, Pt, Au, etc., and lanthanoid and its metal oxides such as La, Ce, etc. by an ion exchange method or impregnation method.

According to an embodiment of the present invention, means is provided for detecting an air to fuel ratio (which is hereinafter referred simply to as "A/F") of the engine to determine in which region of a rich, lean or stoichiometric region the A/F is after completion of the warm-up of the engine. The A/F can be measured by an A/F sensor or $O_2$ sensor. It is preferable for the A/F range to be judged on the basis of at least one of the operating conditions such as the rotating speed of the engine, shaft torque, pulse width of the fuel injection, speed of the vehicle, pressure in the air inlet pipe and so on, when the A/F condition is determined by the engine operating conditions.

These and other objects and features of the present invention will become apparent from the descriptions of preferred embodiments of the present invention in connection with the accompanying drawings.

DESCRIPTION OF THE PREFERRED EMBODIMENTS

Figure 2:
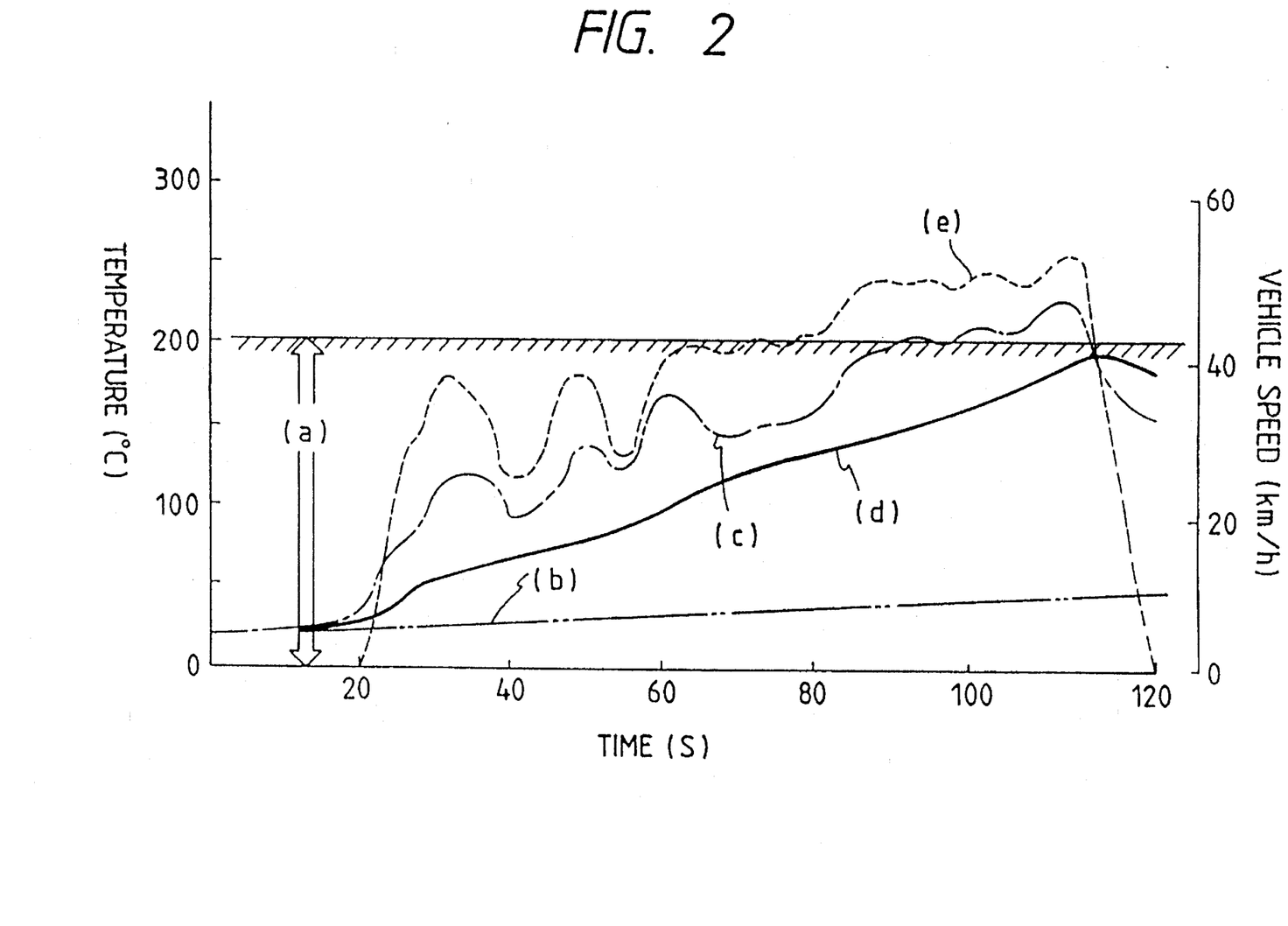
FIG.2 is a graph showing the temperature of a lean $NO_x$ catalyst ( or adsorbent ) installed under the floor of a vehicle, the temperature of the exhaust gas at the inlet of the catalyst, the temperature of the engine cooling water, and so forth measured in the LA-4 mode referred to in the exhaust gas regulation of the United States of America.

FIG.2 shows curves representing the temperature (d) of the lean $NO_x$ catalyst ( or absorbent ) installed under the floor of a vehicle, the temperature (c) of exhaust gas at the inlet of the catalyst, the temperature (b) of the cooling water, the vehicle speed ( e ) and the hydrocarbon from FIG.2, during the period of 120 seconds after the engine starts the temperature of the exhaust gas rises merely up to about 200° C., and does not reach 300° to 350° C. in which the engine starts and not reaches 300° to 350° C. in which the catalyst sufficiently exhibits its catalytic function. Thus during this period a large amount of hydrocarbons is exhausted without purification. As readily seen, the hydrocarbon adsorbing temperature range (i.e., active temperature range) of the lean $NO_x$ catalyst is approximately below 200° C., though it depends on the carrier and carried substances of the catalyst. This means that the catalyst can exhibit its function as an adsorbent for hydrocarbons during about 120 seconds after the engine starts during which a large amount of hydrocarbon is exhausted. Further, during this period, the temperatures of both the exhaust gas and the cooling water are so low that these temperatures may be detected and used to judge the starting condition.

Figure 1:
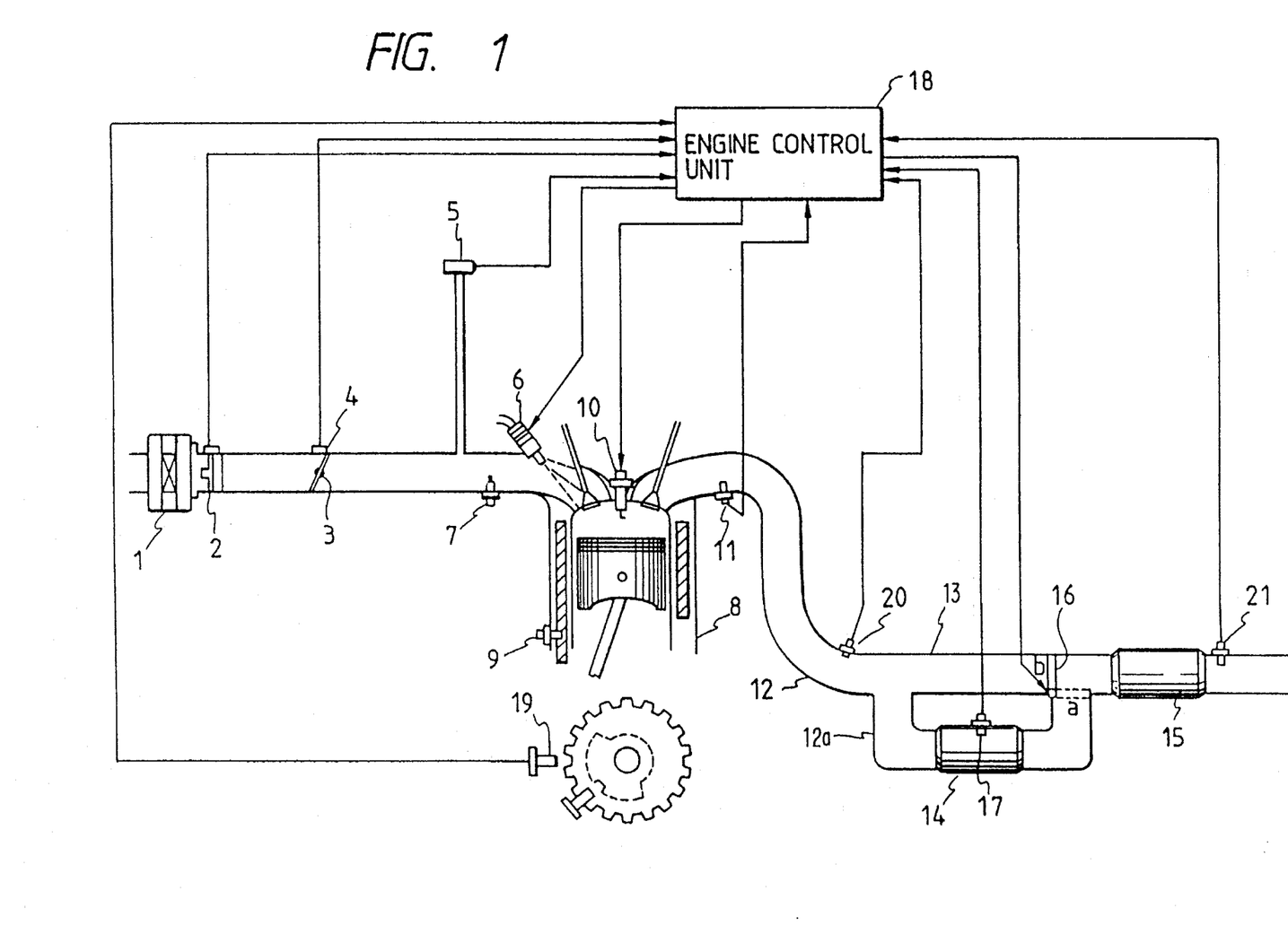
FIG.1 is a conceptual view of an exhaust gas removing apparatus showing an embodiment according to the present invention.
Figure 3:
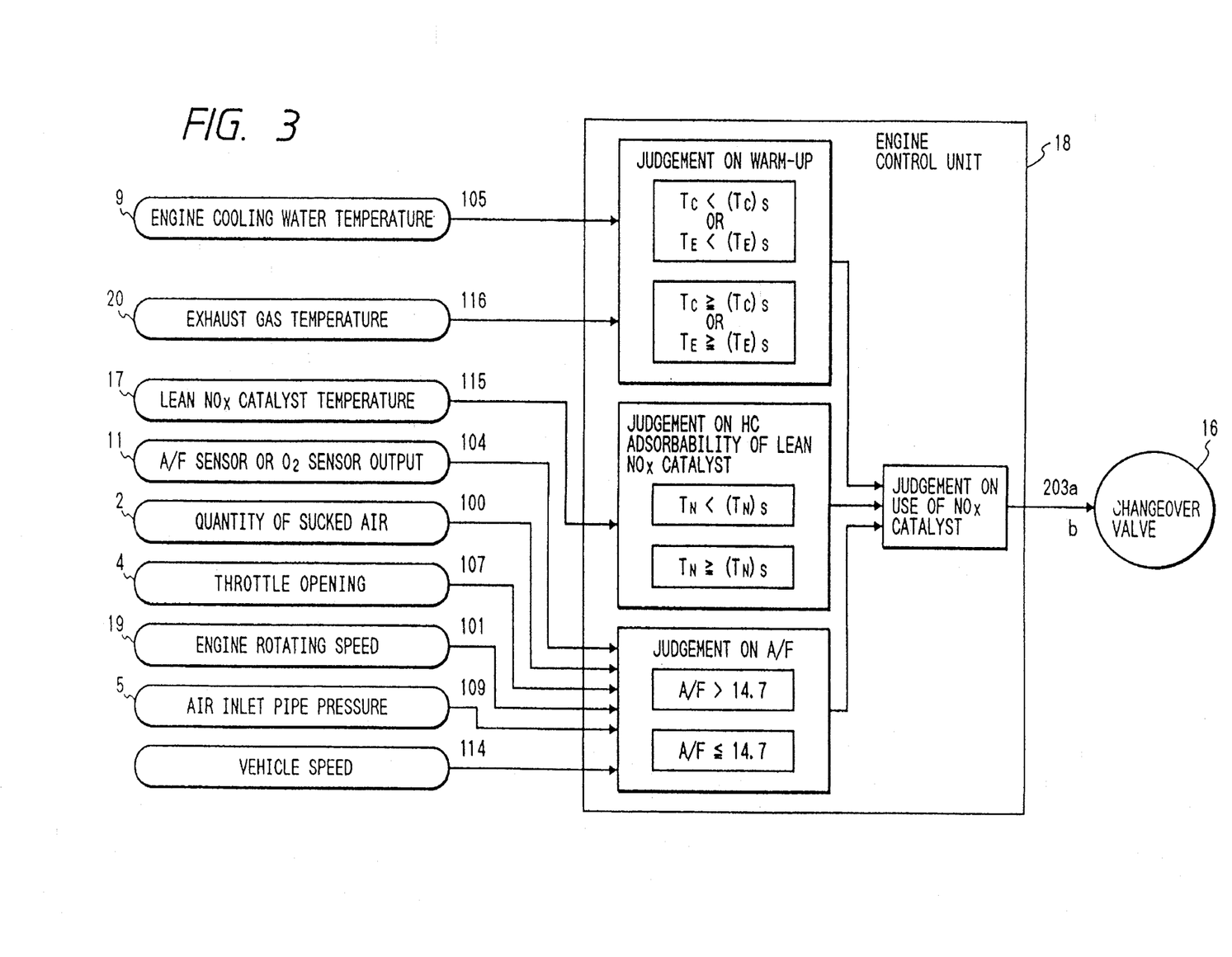
FIG.3 is a functional block diagram of a control system for an exhaust gas changeover valve shown in FIG.1 according to the present invention.

Referring to FIGS.1 and 3, an exhaust gas purifying apparatus as an embodiment of the present invention is shown in a vehicle internal combustion engine 8 in which the lean burn combustion can be made. An exhaust gas removing system and its condition detecting means has a lean $NO_x$ catalyst 14 provided in exhaust gas passage 12a, a three way catalyst 15 provided in a main exhaust gas passage 12, an exhaust gas temperature sensor 20, an A/F sensor 11, a lean $NO_x$ catalyst temperature sensor 17 and a gas flow regulator such as exhaust gas changeover valve 16 provided in the cross portion of the main exhaust gas passage 12 and the exhaust gas passage 12a on the outlet side thereof so as to be positioned at the downstream end of the bypath exhaust gas passage 13. An internal combustion engine operating condition detecting means has a cooling water temperature sensor 9, a throttle aperture sensor 4 for sensing the aperture or opening degree of a throttle valve 3, an inlet air temperature sensor 7, an inlet pipe pressure sensor 5 and an air flow sensor 2; an alarm sensor 21 warns of abnormality of the temperature of the three way catalyst 15. An engine control unit 18 controls the exhaust gas changeover valve 16. In operation, the inlet air to the engine is filtered by an air cleaner 1, and the flow rate is measured by the air flow sensor 2. The air flow sensor 2 generates an electric signal 100 representing the measured flow rate, which is input to the engine controlling unit 18. The air flow rate is determined by the opening degree of the throttle valve 3, which is sensed by the throttle aperture sensor 4 for generating an electric signal 107 representing the opening degree of the throttle valve 3 so as to input the signal 107 to the engine controlling unit 18. The pressure sensor 5 senses the pressure in the air inlet pipe and converts this pressure into an electric signal 109, which is introduced into the engine controlling unit 18. The fuel is injected into the engine 8 by a fuel injector 6, the quantity of which is calculated by the engine controlling unit 18 on the basis of an electric signal 105 representing the temperature of the cooling water sensed by the cooling water temperature sensor 9, the electric signal 100 representing the air flow rate, an electric signal 101 representing the engine rotating speed sensed by a crank angle sensor 19, and so on. The mixed gas sucked into the engine 8 is ignited with a spark plug 10 and burned on the basis of a control signal from the engine controlling unit 18 to the spark plug 10 and the burned mixed gas is discharged through the main exhaust gas passage 12 as an exhaust gas. The A/F sensor 11 is provided at the exit of the engine to sense the A/F and convert the sensed A/F into an electric signal 104. It is also possible to use an $O_2$ sensor instead of the A/F sensor 11. The A/F is feedback-controlled on the basis of the electric signal 104 sensed by the A/F sensor 11 ( or the $O_2$ sensor ). The lean temperature sensor 17 senses the temperature of the lean $NO_x$ catalyst and converts it into an electric signal 115 so as to conduct it to the engine controlling unit 18. The engine control unit 18 is further supplied with an electric signal 116 representing the temperature of the exhaust gas sensed by the exhaust gas temperature sensor 20 and an electric signal 114 representing the vehicle speed.

The detected temperature of the exhaust gas and that of the cooling water can be used to judge whether or not the engine is warming up. The temperature of the lean $NO_x$ catalyst may be inferred from the temperature of the exhaust gas in place of being directly sensed by the lean $NO_x$ catalyst temperature sensor 17.

The A/F may be obtained by using control signals thereof for setting the engine operating condition instead of the output signal of the A/F sensor 11. Such control signals comprise the engine rotating speed signal 101, the aperture signal 107 of the throttle valve 3, the flow rate signal 100 of the inlet air, the pressure signal 109 in the inlet pipe, the vehicle speed signal 114 and so on.

Figure 4:
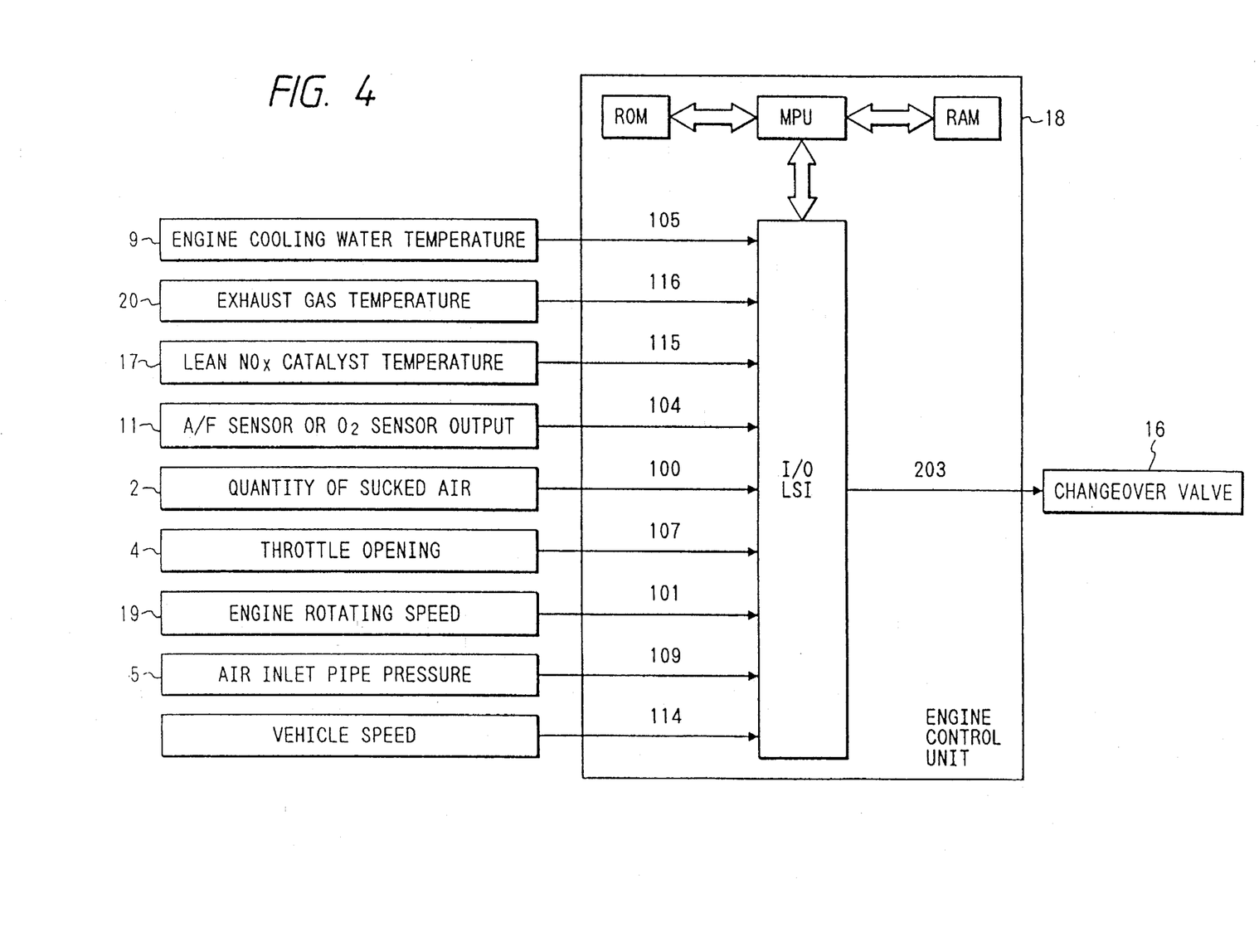
FIG.4 is a basic block diagram of a control system for an exhaust gas changeover valve shown in FIG.1 showing an embodiment according to the present invention.

Referring to FIG.4, the engine controlling unit 18 comprises an I/O LSI serving as an input/output interface of the engine controlling unit 18, a microprocessing unit MPU, a random access memory RAM and a read only memory ROM. The signals from the sensors or the like are led through the I/O LSI to the MPU in which they are processed in such a manner as comparison with data in the RAM and ROM and then are output. The output signal 203 is used to control the exhaust gas changeover valve 16.

Figure 5:
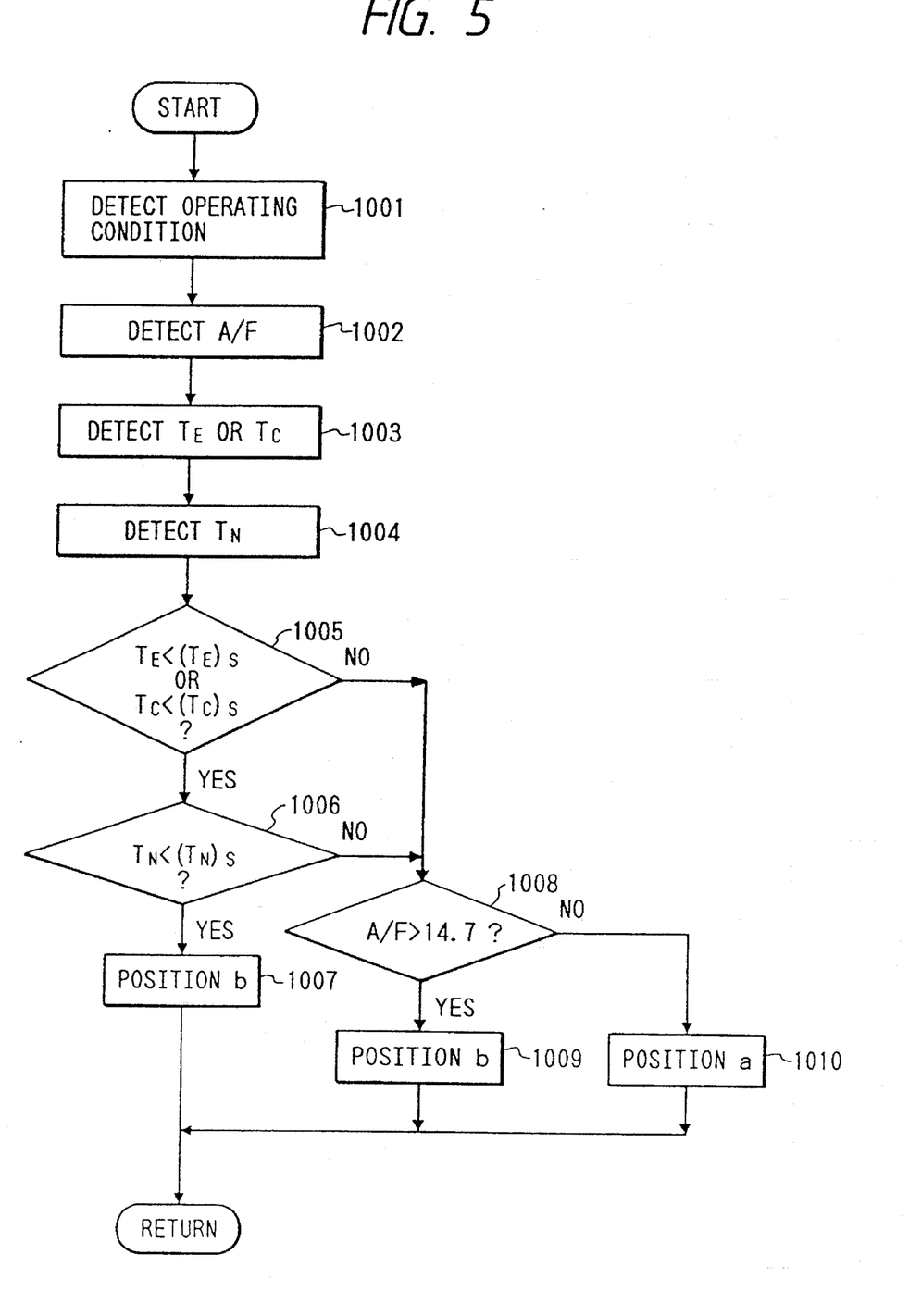
FIG.5 is a flow chart for explaining the changeover of an exhaust gas changeover valve shown in FIG.1 according to the present invention.

The exhaust gas changeover valve 16 is changed over between valve positions a and b (FIG. 1) on the basis of the signals from the cooling water temperature sensor 9, the exhaust gas temperature sensor 20, lean temperature sensor 17 and the A/F sensor 11 as shown in FIG.5. In step 1001, the operating condition data are read out from the various operating condition sensing means. The A/F is sensed or detected in step 1002, the exhaust gas temperature $T_E$ or the engine cooling water temperature $T_C$ is detected in step 1003, and then the lean $NO_x$ catalyst temperature is detected in step 1005. In step 1004, the exhaust gas temperature $T_E$ is compared with a preset reference value $(T_E)_S$ or the engine cooling water temperature $T_C$ is compared with a preset reference value $(T_C)_S$. If $T_E < (T_E)_S$ or $T_C < (T_C)_S$, (whichever is applicable) the processing goes to step 1006, and the lean $NO_x$ catalyst temperature $T_N$ is compared with a preset reference value $(T_N)_S$. If $T_N < (T_N)_S$, the processing goes to step 1007 and the exhaust gas changeover valve 16 is changed over to the position b so that the exhaust gas is passed first through the lean $NO_x$ catalyst 14 and then through the three way catalyst 15. In this case, the engine 8 is warming up after starting and therefore hydrocarbons produced immediately after the engine 8 started are adsorbed by the lean $NO_x$ catalyst.

When $T_E \geq (T_E)_S$ or $T_C \geq (T_C)_S$ in step 1005, or when $T_N \geq (T_N)_S$ in step 1006, which means that the warm-up of the engine 8 has been substantially completed the processing goes to step 1008. When the A/F > 14.7, (i.e. the A/F is in a lean region) the processing goes to step 1009 and the exhaust gas changeover valve 16 is changed over to the position b, and the hydrocarbons adsorbed by the lean $NO_x$ catalyst 14 are released therefrom and purified or removed by the three way catalyst 15. In addition, the nitrogen oxides which are difficult to remove by the three way catalyst 15 are purified or removed by the lean $NO_x$ catalyst 14.

When the A/F $\leq$ 14.7, i.e. the A/F is in a rich or stoichiometric region, the processing goes to step 1010 and the exhaust gas changeover valve 16 is changed over to the position a. In this case, the exhaust gas is passed through the three way catalyst 15 and the toxic components contained in the exhaust gas are purified or removed by the three way catalyst 15.

The exhaust gas cleaning system according to the invention will now be further described by reference to specific experimental examples:

EXPERIMENT 1

A gasoline engine vehicle having the exhaust gas purifying apparatus described above was tested on a chassis dynamometer in the LA-4 mode referred to in the exhaust gas regulation of the United States of America to measure the total HC (hydro-carbon) and $NO_x$ contained in the exhaust gas.

The gasoline engine of the vehicle having a displacement of 2000 cc, was of an in-line four cylinder DOCH type and was operated in the lean region in which the A/F=20 ~ 24 while keeping the vehicle speed higher than 20 km/hr and the opening degree of the throttle valve 13 at a low level. The lean $NO_x$ catalyst comprised a cordierite honeycomb ( the opening area ratio of which is 76% ) having a volume of 1.3 liters, coated with catalytic powders composed of H-type mordenite carrying 5 wt % cobalt ( calculated in terms of $Co_3O_4$). The three way catalyst comprised a cordierite honeycomb ( the opening area ratio of which is 76% ) of volume 1.7 liters, coated with alumina and then Pt, Pd and Rh were carried thereby as catalytic components. The engine warming condition was determined on the basis of the engine cooling water temperature, and warm-up was regarded as completed when the temperature detected by the cooling water temperature sensor 9 reached 40° C., while the temperature of the lean $NO_x$ catalyst was regarded as out of the hydrocarbon adsorbing range of temperature thereof when the temperature detected by the lean $NO_x$ catalyst temperature sensor 17 reached 100° C.

The amounts of HC and $NO_x$ during the time of 505 seconds in the LA-4 mode after the engine started were 4.16 g and 1.80 g, respectively.

EXPERIMENT 2

The experimental conditions were the same as in experiment 1 except that the exhaust gas temperature sensor 20 was used to detect engine warming condition instead of the water temperature sensor 9 used in experiment 1, and warm-up was regarded as completed when the temperature detected by the exhaust gas temperature sensor 20 reached 150° C.

The amounts of HC and $NO_x$ during the time of 505 seconds in the LA-4 mode after the engine started were 4.32 g and 1.85 g, respectively.

EXPERIMENT FOR COMPARISON

This experiment was carried out without using the cooling water temperature sensor 9, the exhaust gas temperature sensor 20 and the lean $NO_x$ catalyst temperature sensor 17. When the signal from the A/F sensor 11 showed that the A/F was in the lean region, the exhaust gas changeover valve 16 was changed over to the position b in response to a signal from the engine control unit 18 so that the exhaust gas was passed through the lean $NO_x$ catalyst 14 and subsequently through the three way catalyst 15. When the signal from the A/F sensor 11 showed that the engine was in the rich or stoichiometric region, the exhaust gas changeover valve 16 was changed over to the position a so that the exhaust gas was passed through only the three way catalyst 15.

The amounts of HC and $NO_x$ during the time of 505 seconds in the LA-4 mode after the engine started were 5.13 g and 2.07 g, respectively.

EXPERIMENT 3

Figure 6:
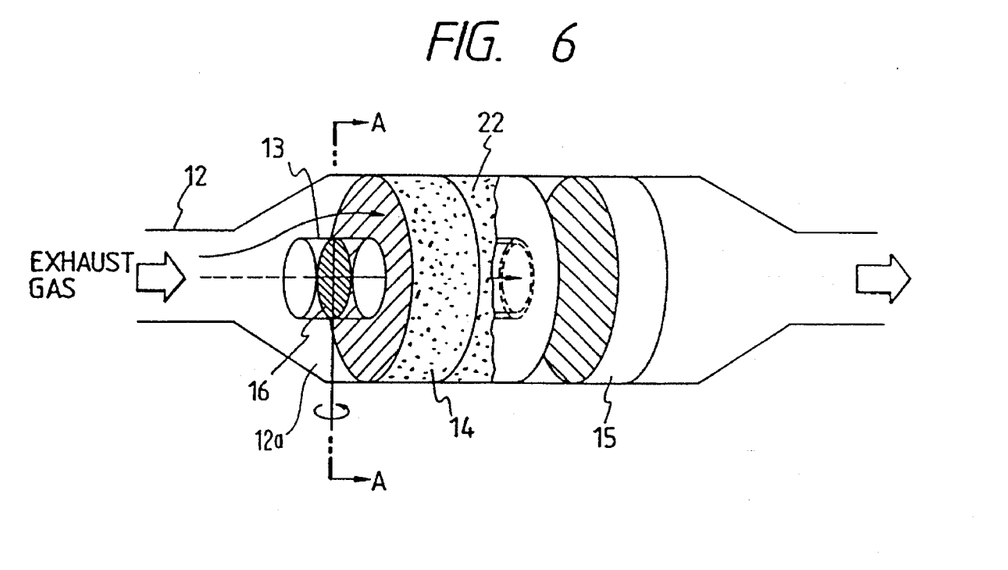
FIG.6 is a conceptual perspective view, partly in section, of an embodiment of a catalyst device for use in an exhaust gas removing apparatus according to the present invention.
Figure 7:
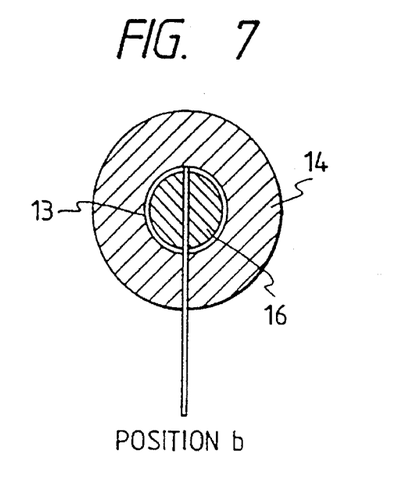
FIG.7 is a cross-sectional view taken along line A—A in FIG.6 when the exhaust gas changeover valve is at its closed position.
Figure 8:
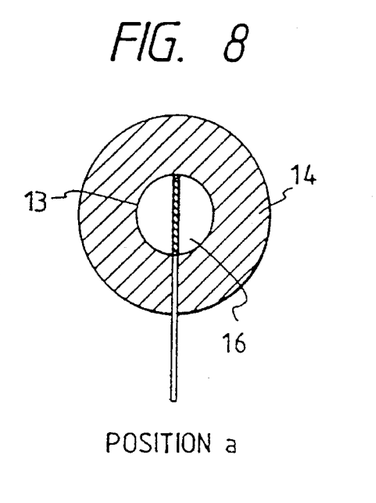
FIG.8 is a cross-sectional view taken along line A—A of FIG.6 when the exhaust gas changeover valve is at its open position.

Referring to FIGS.6 to FIG.8, the lean $NO_x$ catalyst 14 is provided in the main exhaust gas passage 12, while the three way catalyst 15 is also in the main exhaust gas passage 12, downstream from the lean $NO_x$ catalyst. The bypath exhaust gas passage 13 is provided penetrating through the lean $NO_x$ catalyst 14 and has therein the exhaust gas changeover valve 16 so as to selectively change over the same to the positions a and b to thereby open and close the bypath exhaust gas passage 13. When the exhaust gas changeover valve 16 is at the position b as shown in FIG.7, the exhaust gas is passed through the lean $NO_x$ catalyst 14 and the three way catalyst 15 because the bypath exhaust gas passage 13 is closed. On the other hand, when the exhaust gas changeover valve 16 is at the position a shown in FIG.8, the exhaust gas is passed through the bypath exhaust passage 13 and subsequently through the three way catalyst 15 without being passed through the lean $NO_x$ catalyst 14 because the bypath exhaust gas passage 13 is opened. With this embodiment, the exhaust gas purifying system can be made extremely compact.

The performance of the above exhaust gas purifying system was evaluated under the same condition as in experiment 1 and by the same method as therein except that the lean $NO_x$ catalyst and the three way catalyst had a volume of 1.3 liters and a volume of 1.7 liters, respectively.

The amounts of HC and $NO_x$ during the time of 505 seconds in the LA-4 mode after the engine started were 4.13 g and 1.78 g, respectively.

A hydrocarbon adsorbent 22 which the bypath exhaust gas passage 13 penetrates may be further provided in the main exhaust gas passage 12 after the lean $NO_x$ catalyst 14 so as to be brought into close contact therewith.

EXPERIMENT 4

Figure 9:
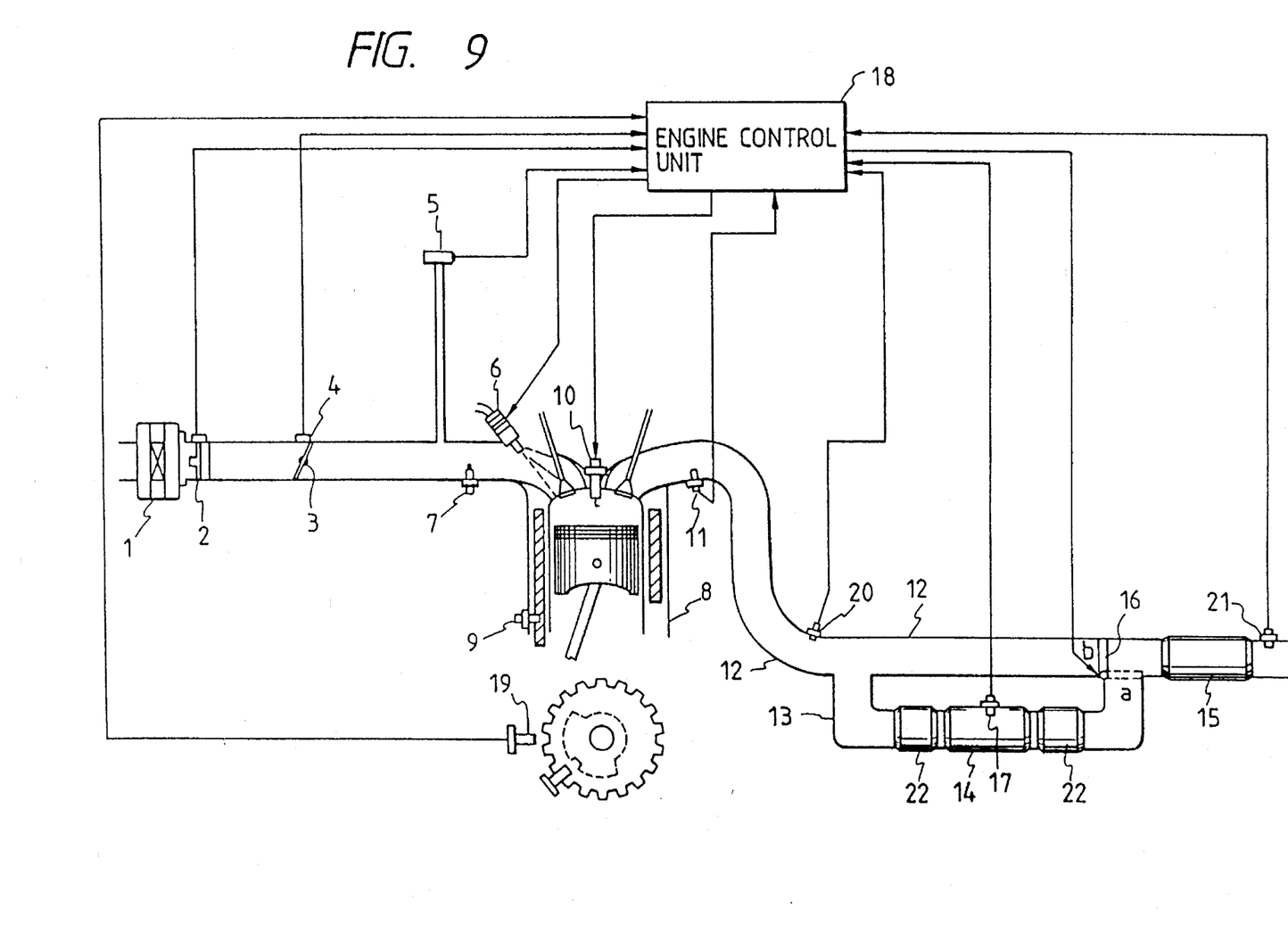
FIG.9 is a conceptual view of an exhaust gas removing apparatus showing another embodiment according to the present invention.

Referring to FIG.9, the structure and operation of an embodiment shown in FIG.9 were substantially the same as those shown in FIG.1 except that the hydrocarbon adsorbents 22 were provided in the bypath exhaust gas passage 13 on the upstream and the downstream sides of the lean $NO_x$ catalyst. The performance of the exhaust gas purifying system was been evaluated under the same condition as in experiment 1 and by the same method as therein.

The amounts of HC and $NO_x$ during the time of 505 seconds in the LA-4 mode after the engine started were 4.12 g and 1.80 g, respectively.

Since it is obvious that many changes and modifications can be made in the above described details without departing from the nature and spirit of the present invention, it is to be understood that the present invention is not to be limited to the details described herein.

What is claimed is:

1. An apparatus for purifying an exhaust gas discharged from an internal combustion engine, comprising:

a first exhaust gas passage including a nitrogen oxide removing catalyst and a three way catalyst;

a second exhaust gas passage including the three way catalyst;

a gas flow regulator for selectively directing the exhaust gas to the first and second exhaust gas passages; and a control unit for controlling the gas flow regulator to direct the exhaust gas to the first exhaust gas passage, through the nitrogen oxide removing catalyst and the three way catalyst when temperature of the nitrogen oxide removing catalyst is within a hydrocarbon adsorbing range thereof while the engine is warming up, and to the second exhaust gas passage, through the three way catalyst, when the temperature of the nitrogen oxide removing catalyst exceeds the hydrocarbon adsorbing range.

2. An apparatus according to claim 1, further comprising means for determining whether or not the engine is warming up after starting, and means for determining whether or not the temperature of the nitrogen oxide removing catalyst exceeds the hydrocarbon adsorbing range of temperature thereof.

3. An apparatus according to claim 2, wherein the warm-up determining means comprises means for detecting temperature of at least one of engine cooling water temperature and exhaust gas temperature.

4. An apparatus according to claim 3, further comprising a sensor for detecting whether an air to fuel ratio of the engine is in a rich, lean or stoichiometric region after completion of the warm-up of the engine, and wherein the control unit controls the gas flow regulator to direct exhaust gas to the second exhaust gas passage when the air to fuel ratio detected by said sensor is in the rich and stoichiometric regions.

5. An apparatus according to claim 4, wherein the control unit controls the gas flow regulator to direct exhaust gas to the first exhaust gas passage when the air to fuel ratio detected by said sensor is in the lean region.

6. An apparatus according to claim 5, wherein the control unit controls the gas flow regulator to direct exhaust gas to the second exhaust gas passage when the temperature of the nitrogen oxide removing catalyst exceeds the hydrocarbon adsorbing range thereof, while the engine is warming up.

7. An apparatus according to claim 6, wherein the control unit compares the detected temperature of at least one of engine cooling water temperature and exhaust gas temperature with a predetermined value.

8. An apparatus according to claim 8, wherein the nitrogen oxide removing catalyst temperature determining means comprises a sensor for detecting the temperature of one of: the nitrogen oxide removing catalyst and the exhaust gas at an outlet thereof.

9. An apparatus according to claim 8, wherein the control unit compares the detected temperature of one of the nitrogen oxide removing means and the exhaust gas at the outlet thereof, with a predetermined value.

10. An apparatus according to claim 9, wherein the control unit compares the air to fuel ratio detected by said sensor, with a predetermined value.

11. An apparatus according to claim 1, wherein:
the second exhaust gas passage constitutes part of a main exhaust gas passage extended from the engine;
the main exhaust gas passage has a bypass exhaust gas passage provided upstream from the three way catalyst; and
the nitrogen oxide removing catalyst is provided in the first exhaust gas passage together with the three way catalyst.

12. An apparatus according to claim 1, wherein the first exhaust gas passage further comprises a hydrocarbon adsorbent other than the nitrogen oxide removing catalyst, the hydrocarbon adsorbent being provided upstream from the three way catalyst.

13. An apparatus according to claim 12, further comprising a sensor for detecting whether an air to fuel ratio of the engine is in a rich, lean or stoichiometric region after completion of the warm-up of the engine, and wherein the control unit controls the gas flow regulator to direct the exhaust gas to the second exhaust gas passage when the air to fuel ratio detected by said sensor is in the rich and stoichiometric regions.

14. An apparatus according to claim 12, wherein:
the second exhaust gas passage constitutes part of a main exhaust gas passage extended from the engine;
the main exhaust gas passage has a bypass exhaust gas passage provided upstream from the three way catalyst; and
the nitrogen oxide removing catalyst and the hydrocarbon adsorbent are provided in the first exhaust gas passage together with the three way catalyst.

15. An apparatus according to claim 14, wherein the control unit is provided at a downstream end of the bypass exhaust gas passage.

16. Apparatus for cleaning an exhaust gas discharged from an internal combustion engine by means of a three way catalyst disposed in an exhaust passage of said internal combustion engine, said apparatus comprising:

at least one sensor for detecting at least an operating temperature of said internal combustion engine;

a nitrogen oxide removing catalyst disposed in said exhaust passage upstream of said three way catalyst relative to a direction of exhaust gas flow in said exhaust gas passage;

a bypass passage for conveying said exhaust gas around said nitrogen oxide removing catalyst without passing therethrough;

a gas flow regulator for selectively causing said exhaust gas to flow through said bypass passage when said at least an operating temperature of said internal combustion engine exceeds a predetermined level, and for causing said exhaust gas to flow through said nitrogen oxide removing catalyst when said at least an operating temperature of said internal combustion engine is below a predetermined level.

17. Apparatus according to claim 16, wherein said at least an operating temperature comprises a temperature of said nitrogen oxide removing catalyst.

18. Apparatus according to claim 17, wherein said predetermined level is set at an upper limit of a hydrocarbon adsorbing range of said nitrogen oxide removing catalyst.

19. Apparatus according to claim 16, wherein said at least one operating temperature comprises a first temperature of said nitrogen oxide removing catalyst, and a second temperature of one of: engine coolant of and exhaust gas.

20. Apparatus according to claim 19, wherein said gas flow regulator causes said exhaust gas to flow through said bypass passage when either of said first and second temperatures exceeds a respective first and second predetermined level.

21. A method of purifying an exhaust gas discharged from an internal combustion engine provided with a first exhaust gas passage including a nitrogen oxide removing catalyst and a three way catalyst, and a second exhaust gas passage including the three way catalyst, the method comprising the steps of:

determining whether or not the engine is warming up after starting;

determining whether or not temperature of the nitrogen oxide removing catalyst exceeds a hydrocarbon adsorbing range thereof; and directing the exhaust gas to said first exhaust gas passage through the nitrogen oxide removing catalyst and thereafter through the three way catalyst when temperature of the nitrogen oxide removing catalyst is within the hydrocarbon adsorbing range thereof while the engine is warming up, and to the second exhaust gas passage through the three way catalyst when the temperature of the nitrogen oxide removing catalyst exceeds the hydrocarbon adsorbing range thereof.

22. A method according to claim 21, wherein the first exhaust gas passage further includes a hydrocarbon adsorbent other than the nitrogen oxide removing catalyst, the hydrocarbon adsorbent being provided upstream from the three way catalyst relative to a direction of exhaust gas flow.

23. A method according to claim 21, further comprising the steps of:

detecting whether an air to fuel ratio of the engine is in a rich, lean or stoichiometric region after completion of the warm-up of the engine; and directing the exhaust gas to the second exhaust gas passage when the detected air to fuel ratio is in the rich and stoichiometric regions.

24. A method according to claim 23, wherein the exhaust gas directing step directs the exhaust gas to the first exhaust gas passage when the air to fuel ratio is in the lean region.

25. Method of cleaning an exhaust gas discharged from an internal combustion engine by means of a three way catalyst disposed in an exhaust passage of said internal combustion engine, said method comprising the steps of:

sensing at least an operating temperature of said internal combustion engine;

selectively passing said exhaust gas through a nitrogen oxide removing catalyst disposed upstream of said three way catalyst relative to a direction of exhaust gas flow, when said at least one operating temperature is below a predetermined level; and     selectively causing said exhaust gas to bypass said nitrogen oxide removing catalyst when said at least one operating temperature exceeds said predetermined level.

26. Method according to claim 25, wherein said at least one operating temperature comprises a temperature of said nitrogen oxide removing catalyst.

27. Method according to claim 26, wherein said predetermined level is set at an upper limit of a hydrocarbon adsorbing range of said nitrogen oxide removing catalyst.

28. Method according to claim 25, wherein said at least one operating temperature comprises a first temperature of said nitrogen oxide removing catalyst and a second temperature of one of engine coolant and said exhaust gas.

29. Method according to claim 28, wherein said step of selectively passing said exhaust gas through a nitrogen oxide removing catalyst is performed when said first and second temperatures are below first and second predetermined levels respectively.

30. An apparatus for purifying an exhaust gas discharged from an internal combustion engine, comprising:

a first exhaust gas passage including a nitrogen oxide removing catalyst and a three way catalyst;

a second exhaust gas passage including the three way catalyst;

means for determining an operating temperature of said internal combustion engine;

means for determining a temperature of said nitrogen oxide removing catalyst; and     a control unit for causing said exhaust gas to flow through said first exhaust gas passage when said operating temperature of said internal combustion engine is below a first threshold value and said temperature of said nitrogen oxide removing catalyst is below a second threshold value, and for causing said exhaust gas to flow through said second exhaust gas passage when either said operating temperature of said internal combustion engine is above said first threshold or said temperature of said nitrogen oxide removing catalyst is above said second threshold value.

31. Apparatus according to claim 30, further comprising means for determining an air/fuel ratio of said internal combustion engine, wherein said control unit causes said exhaust gas to flow through said first exhaust gas passage when said air/fuel ratio is above a third threshold value.

\* \* \* \* \*